Aug. 29, 1944.        J. HOLTHE         2,356,847
STALL WARNING DEVICE
Filed Dec. 1, 1942

Inventor
JOHN HOLTHE
By George Douglas Jones
Attorney

Patented Aug. 29, 1944

2,356,847

UNITED STATES PATENT OFFICE 2,356,847

STALL WARNING DEVICE

John Holthe, Baltimore, Md., assignor to The Glenn L. Martin Company, Middle River, Md., a corporation of Maryland Application December 1, 1942, Serial No. 467,483

3 Claims. (Cl. 200—81)

This invention relates to a stall warning or indicating device.

It is a well known fact that the stall condition starts in a local area of the wing, the location depending upon the shape of the wing. It is characteristic of a wing to have a location or area where the stall condition starts, that is, where lift will first disappear.

By this invention, a pilot is warned of the approach of a stalled condition of the wings.

Such a device reduces the hazzard, and simplifies pilot training, since the student would not have to constantly watch the instrument board before getting the "feel" of the plane with respect to stalling speed.

Another object of this invention is the provision of a unitary device which is readily adaptable and easily installed in existing structures.

Further and other objects will become apparent from the description of the accompanying drawing which forms a part of this disclosure and in which like numerals refer to like parts.

Figure 1:
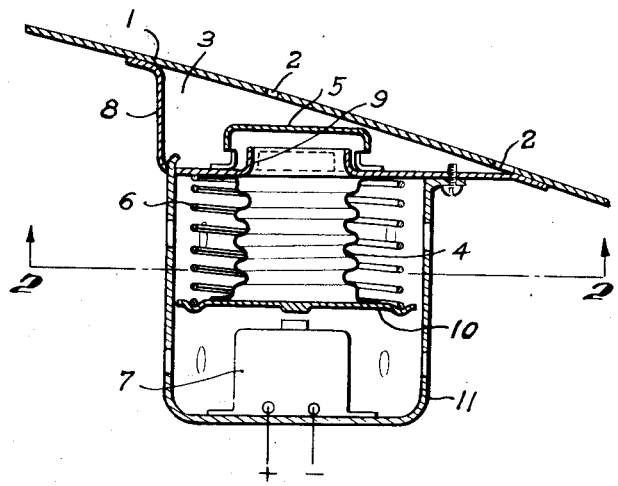
Figure 1 is a vertical sectional view of the device.
Figure 2:
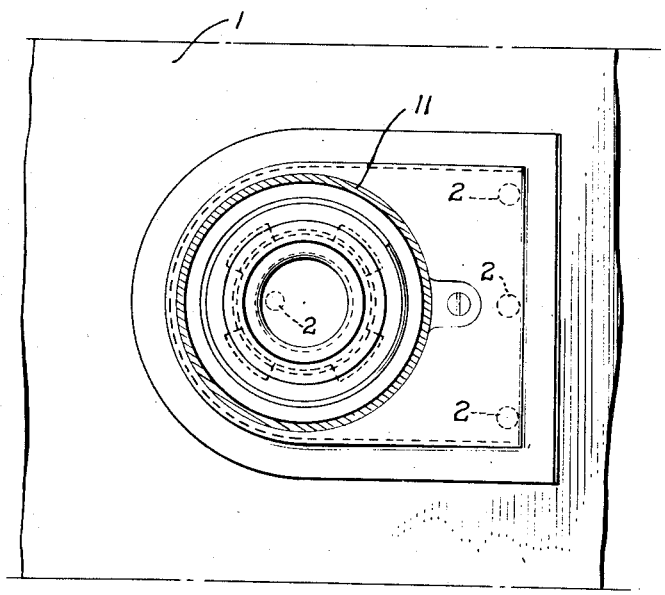
Figure 2 is a section taken on the line 2—2 of Figure 1.

After determining in a wind-tunnel or by any other means, the location or area of the wing where stall will start, the device shown in the drawing may be installed.

A portion of the upper wing surface 1, in the selected area, is pierced by one or more small holes 2, which lead into a compartment 3 formed on the under side of the upper wing surface by bracket member 8, secured thereto, in sealed relation. It will be noted that one or more of the holes 2, should be located adjacent the joint of the trailing edge of the bracket and the wing skin to provide drainage for compartment 3.

The bracket has formed therein an opening surrounded by an up standing flange or collar 9. Inverted over the flanged opening and secured to the bracket is a cup shaped member 5 having apertures therein. The bracket, flange 9 and member 5 form a trap, to prevent particles of solid or water from entering Sylphon bellows 4. The upper end of the bellows is secured to the underside of the bracket, surrounding the aperture. The lower end of the bellows is secured to plate 10. Spring 6 forces the plate 10, downwardly away from the bracket.

The button of micro-switch 7 is actuated by plate 10 under the influence of spring 6.

Micro-switch 7 is secured to vented cover member 11 which is removably secured to bracket 8 and thus forms a unitary device which can readily be installed on most existing wing structure.

The flow of air over the upper surface of the wing which causes the lift due to a reduction in pressure, also reduces the pressure in chamber 3, due to the communicating holes, and in bellows 4, being in communication with chamber 3, by means of the passage formed by members 5 and 9. Upon a reduction of air pressure in bellows 4, the air pressure in the wing compresses the bellows and moves plate 10 upwardly against the spring.

While the attitude of the wing is such that the lift is maintained, micro-switch 7 is open. Upon the disappearance of the lift in the area of the holes 2, spring 6 will force plate 10 downwardly, closing switch 7 which operates a signal, or indicator to warn the pilot of the approach of a stalled condition of the wing, or it may be used to actuate the automatic controls in a corrective direction.

It is to be understood that certain changes, alterations, modifications and substitutions can be made without departing from the spirit and scope of the appended claims.

I claim as my invention:

1. A switch mechanism for a stall warning device for an airfoil comprising, apertures formed in the skin of said airfoil in the area where it is desired to ascertain lift, a member secured to the under surface of the skin forming therewith a compartment over the apertured area, said compartment being substantially wedge-shaped, tapering to the rear of the airfoil, being formed by the skin and the compartment floor which is substantially parallel to the chord of said airfoil, a pressure responsive switch means, actuated by the pressure in said compartment, said apertures in the skin toward the rear of said compartment adapted to form a drain to prevent flooding of said compartment.

2. A switch mechanism for a stall warning device for an airfoil comprising, apertures formed in the skin of said airfoil in the area where it is desired to ascertain a condition of loss of lift, an indented member secured to the under surface of the skin forming therewith a compartment covering the apertured area, a switch secured to said member and adapted to be actuated in response to the pressure in said compartment.

3. A switch mechanism for a stall warning device for an airfoil comprising, apertures formed in the skin of said airfoil in the area where it is desired to ascertain lift, a member secured to the under surface of the skin forming therewith a compartment over the apertured area, said compartment being substantially wedge-shaped, tapering to the rear of the airfoil, being formed by the skin and the compartment floor which is substantially parallel to the chord of said airfoil, a pressure responsive switch means, duct means affording communication between said compartment and said pressure responsive switch means, trap means in said compartment adjacent said duct means to prevent rain water from flooding said pressure responsive switch means, apertures to the rear of the airfoil adapted to form a drain for said compartment.

JOHN HOLTHE.